(12) United States Patent
Ohyama et al.

(10) Patent No.: US 8,094,540 B2
(45) Date of Patent: Jan. 10, 2012

(54) OPTICAL PICKUP AND OPTICAL DEVICE

(75) Inventors: Minoru Ohyama, Yokohama (JP);
Takahiro Kaneko, Yokohama (JP)

(73) Assignee: Victor Company of Japan, Limited,
Yokohama, Kanagawa-ken (JP)

( * ) Notice: Subject to any disclaimer, the term of this patent is extended or adjusted under 35 U.S.C. 154(b) by 255 days.

(21) Appl. No.: 12/458,406

(22) Filed: Jul. 10, 2009

(65) Prior Publication Data

US 2010/0008205 A1 Jan. 14, 2010

(30) Foreign Application Priority Data

Jul. 11, 2008 (JP) .............................. P2008-181745
Jan. 8, 2009 (JP) .............................. P2009-002714

(51) Int. Cl.
*G11B 7/12* (2006.01)
(52) U.S. Cl. .................. 369/112.03; 369/112.1
(58) Field of Classification Search .................. 369/103, 369/112.01, 112.1, 112.05, 112.09, 112.11, 369/112.03, 112.15
See application file for complete search history.

(56) References Cited

U.S. PATENT DOCUMENTS

| | | | | |
|---|---|---|---|---|
| 6,043,935 A * | 3/2000 | Lee | ............ | 369/112.05 |
| 7,095,687 B2 * | 8/2006 | Nishi | ............ | 369/44.42 |
| 7,567,496 B2 * | 7/2009 | Ohyama | ............ | 369/112.15 |
| 2003/0223325 A1 * | 12/2003 | Shimano et al. | ............ | 369/44.26 |
| 2004/0125735 A1 * | 7/2004 | Kyong et al. | ............ | 369/112.07 |
| 2006/0104182 A1 * | 5/2006 | Sun | ............ | 369/112.01 |
| 2007/0109946 A1 * | 5/2007 | Hiraga et al. | ............ | 369/112.05 |
| 2008/0031118 A1 | 2/2008 | Park et al. | | |
| 2008/0232223 A1 * | 9/2008 | Murakami | ............ | 369/112.03 |
| 2008/0316600 A1 | 12/2008 | Koyanagi et al. | | |

FOREIGN PATENT DOCUMENTS

| | | |
|---|---|---|
| JP | 2000-123376 A | 4/2000 |
| JP | 2007-200471 A | 8/2007 |
| JP | 2007250123 | 9/2007 |
| WO | WO 2004/003901 A1 | 1/2004 |
| WO | WO 2007/069660 A1 | 6/2007 |

* cited by examiner

*Primary Examiner* — Wayne Young
*Assistant Examiner* — Thomas Alunkal
(74) *Attorney, Agent, or Firm* — The Nath Law Group; Jerald L. Meyer; Jiaxiao Zhang

(57) ABSTRACT

An optical pickup includes a first laser beam light source 1 for emitting a light flux of a first wavelength, a diffraction grating 5 and an optical device 6 having a second laser beam light source 7 for emitting a light flux of a second wavelength and a hologram element 8. In operation, the diffraction grating 5 diffracts the backward light of the first wavelength at a predetermined angle. The hologram element 8 diffracts the backward light of the second wavelength by a first area 8a and also diffracts the backward light of the first wavelength at a reversed-polarity angle to the first area 8a by a second area 8b.

12 Claims, 6 Drawing Sheets

OPTICAL PICKUP AND OPTICAL DEVICE

BACKGROUND OF THE INVENTION

1. Field of the Invention

The present invention relates to an optical pickup which performs recording and/or reproducing of information signals with respect to information recording media, such as optical discs, and also related to an optical device constituting the optical pickup.

2. Description of the Related Art

A variety of optical discs have been hitherto used as consumer information recording media. For these optical discs, there exist so-called "CD" (Compact Disc), "DVD" (Digital Versatile Disc, etc. in widespread use. Recently, not only playback-only standards but various recordable standards (e.g. "CD-R", "CD-RW", "DVD-RAM", "DVD-R", "DVD-RW", "+R", "+RW", etc.) have been in widespread use rapidly. In addition, there are also proposed "BD" (Blu-ray Disc) and "HD-DVD" as optical discs corresponding to high-definition video signals.

In the optical pickup, which is essential to a recording/reproducing device (optical-disc system) for recording and/or reproducing information signals to and from these optical discs, the function of receiving and emitting light is fundamental. Nevertheless, due to the operations of focus-servo (focusing adjustment) and tracking-servo (track-following adjustment), which are physically-basic actions in the recording/reproducing device, optical and electrical functions for detecting a focus-error signal and a tracking-error signal used for these servo operations are essential to the optical pickup.

In order to allow such an optical pickup to correspond to optical discs based on a plurality of standards mentioned above, it is necessary for the optical pickup to have the capability of detecting a plurality of error signals best for the optical discs based on respective standards. Under such a situation, there is required an optical pickup having a rational optical system enabling both simple structure and improved accuracy, in the market. In fact, there is a development race of such an optical pickup in this field.

An optical device where a laser beam light source, a light-receiving element and a hologram element having a divergent function of outward and backward optical paths and a lens function of error generation are integrated with each other, has contributed much to simplification of the optical pickup in constitution and therefore, there have been proposed new technologies in this field. In addition, a two-wavelength pickup and a two-wavelength integrated device have been proposed in order to accomplish compatibility between "CD" system and "DVD" system. Japanese Patent Publication Laid-open No. 2000-123376 has disclosed an optical pickup having an integrated light receiving/emitting function of two wavelengths.

In an optical pickup to meet a recordable standard, an optical system incorporating a Can laser unit advantageous to heat radiation or a polarization beam splitter becomes mainstream. For the technology to simultaneously dissolve contradictory propositions in the optical pickup meeting the recordable standard, International Patent Publication Laid-open No. WO2004/003901A1 has disclosed a constitution that embodies both a function of detecting two wavelengths for "CD" and "DVD" and a function of emitting light for "CD" in the form of an integrated optical device, while the Can laser unit for "DVD" is independent of the optical device.

Furthermore, Japanese Patent Publication Laid-open No. 2007-200471 has disclosed the structure of an integrated device focusing attention on simplification of a light-receiving element (or photo detector IC: PDIC). In this integrated device, it is possible to not only accomplish both simplification in circuit size and reduction in manufacturing cost but simplify the light-receiving element and the circuit while maintaining the function of detecting two wavelengths.

SUMMARY OF THE INVENTION

Meanwhile, the prior art optical pickup mentioned above deals with the possibility of conventional standards for "CD" and "DVD" and is directed to simplification in the constitution of an optical pickup capable of detecting two kinds of wavelengths. Suppose, here, the correspondence of an optical pickup to also standard "BD". In this case, the optical pickup is required to have a laser, a light-receiving element and other optical components corresponding to the waveband of 405 nm in wavelength, so that the integration of an optical system coping with two to three wavelengths is required with the necessity of its downward compatibility with the conventional system, causing the optical system to be complicated in structure and increased in the number of components.

As mentioned above, as the hologram element and the diffraction grating both advantageous to integration of the optical system have sensitive wavelength dependency, they would have difficulty in commoditizing with "BD" even granting that they could be commoditized between standards "CD" and "DVD". That is, as such a sensitive wavelength dependency exposes a great difference in between their diffraction angles, even if dealing with the possibility of an optical system commoditizing a part of the optical axis, there is produced a difference in branch angle due to the difference in wavelengths (in case of applying the optical system on the backward light), making it difficult to commoditize a light-receiving element.

Again, as a blue laser beam in the waveband of 405 nm for "BD" has difficulty in ensuring the reliability against atmospheric exposure due to GaN-type crystal, a laser unit in the form of Can laser is indispensable to reliable airtight sealing. Therefore, it is difficult to provide an integrated device where a laser unit is installed in the form of a tip. Thus, even a playback only optical pickup would be subjected to various restraints in the constitution of the optical system.

Under the above-mentioned situation, an object of the present invention is to provide an optical pickup corresponding to two to three wavelengths including "BD" standard, which integrates other light receiving/emitting functions but Can laser for "BD", adopts a hologram element thereby to avoid increasing of the number of components and lightens the dependency of wavelength variation unique to a diffraction grating thereby to ensure high reliability while simplifying and miniaturizing the constitution and reducing the manufacturing cost.

In order to achieve the above objects, according to the first aspect of the present invention, there is provided an optical pickup for irradiating a convergent light to an information recording medium either to detect a reflecting light produced by reflecting of the convergent light on the information recording medium thereby reading information signals recorded along a recording track of the information recording medium or to write the information signals to the information recording medium, the optical pickup comprising: a first laser beam light source emitting a light flux of a first wavelength to be irradiated to the information recording medium; a diffraction grating disposed in an optical path of a backward light reflected by the information recording medium; and an optical device having: a second laser beam light source emitting a light flux of a second wavelength to be irradiated to the information recording medium through the diffraction grating; a hologram element arranged in an optical path of backward lights produced since the light fluxes of the first wavelength and the second wavelength are reflected by the information recording medium and subsequently transmitted through the diffracting grating; and a light-receiving element for detecting the backward lights, the second laser beam light source, the hologram element and the light-receiving element being fixed with each other integrally, wherein the diffraction grating is arranged in an optical path of one outward light of the light flux of the second wavelength traveling from the second laser beam light source to the information recording medium and also arranged out of an optical path of another outward light of the light flux of the first wavelength traveling from the first laser beam light source to the information recording medium thereby to allow the backward light of the first wavelength to be diffracted at a predetermined angle and also allow the outward light and the backward light of the second wavelength to be transmitted without being diffracted by the diffraction grating, the hologram element is arranged in the optical path of the outward light of the light flux of the second wavelength and also arranged out of the optical path of the outward light of the light flux of the first wavelength, the hologram element having: a first area including a light-flux diameter of the backward light of the second wavelength to diffract the backward light of the second wavelength, thereby irradiating one of ± first-order diffraction lights to a light-receiving area of the light receiving element, in convergence; and a second area including a light-flux diameter of the backward light of the first wavelength diffracted by the diffraction grating at the predetermined angle to diffract the backward light of the first wavelength at a reversed-polarity angle to the first area, thereby irradiating one of ± first-order diffraction lights to the light-receiving area of the light receiving element, in convergence, and wherein the light-receiving element receives the backward light of the first wavelength and the backward light of the second wavelength through its light-receiving areas in the same plane and then outputs detection signals due to photoelectric conversion.

According to the second aspect of the present invention, there is also provided An optical device having a light receiving/emitting function for use in an optical pickup that irradiates a convergent light of a first wavelength or a second wavelength to an information recording medium either to detect a reflecting light produced by reflecting of the convergent light on the information recording medium thereby reading information signals recorded along a recording track of the information recording medium or to write the information signals to the information recording medium, the optical device comprising: a second laser beam light source arranged independently of a first laser beam light source for emitting the light flux of the first wavelength thereby to emit the light flux of the second wavelength; a diffraction grating disposed in an optical path of a backward light of either the light flux of the first wavelength or the light flux of the second wavelength reflected by the information recording medium; a hologram element arranged in an optical path of backward lights produced since the light fluxes of the first wavelength and the second wavelength are reflected by the information recording medium and subsequently transmitted through the diffracting grating; and a light-receiving element for detecting the backward lights of the first wavelength and the second wavelength, which are transmitted through the hologram element, wherein: the diffraction grating is arranged in an optical path of one outward light of the light flux of the second wavelength traveling from the second laser beam light source to the information recording medium and also arranged out of an optical path of another outward light of the light flux of the first wavelength traveling from the first laser beam light source to the information recording medium thereby to allow the backward light of the first wavelength to be diffracted at a predetermined angle and also allow the outward light and the backward light of the second wavelength to be transmitted without being diffracted by the diffraction grating; the hologram element is arranged in the optical path of the outward light of the light flux of the second wavelength and also arranged out of the optical path of the outward light of the light flux of the first wavelength, the hologram element having: a first area including a light-flux diameter of the backward light of the second wavelength to diffract the backward light of the second wavelength, thereby irradiating one of ± first-order diffraction lights to a light-receiving area of the light receiving element, in convergence, and a second area including a light-flux diameter of the backward light of the first wavelength diffracted by the diffraction grating at the predetermined angle to diffract the backward light of the first wavelength at a reversed-polarity angle to the first area, thereby irradiating one of ± first-order diffraction lights to the light-receiving area of the light receiving element, in convergence; the light-receiving element receives the backward light of the first wavelength and the backward light of the second wavelength through its light-receiving areas in the same plane and then outputs detection signals due to photoelectric conversion; and the second laser beam light source, the diffraction grating, the hologram element and the light-receiving element are integrally fixed with each other in mutual positional relationships, respectively.

DETAILED DESCRIPTION OF THE PREFERRED EMBODIMENTS

There will be described below an embodiment of the present invention with reference to the drawings.

(Constitution of Optical Pickup 1)

Figure 1:
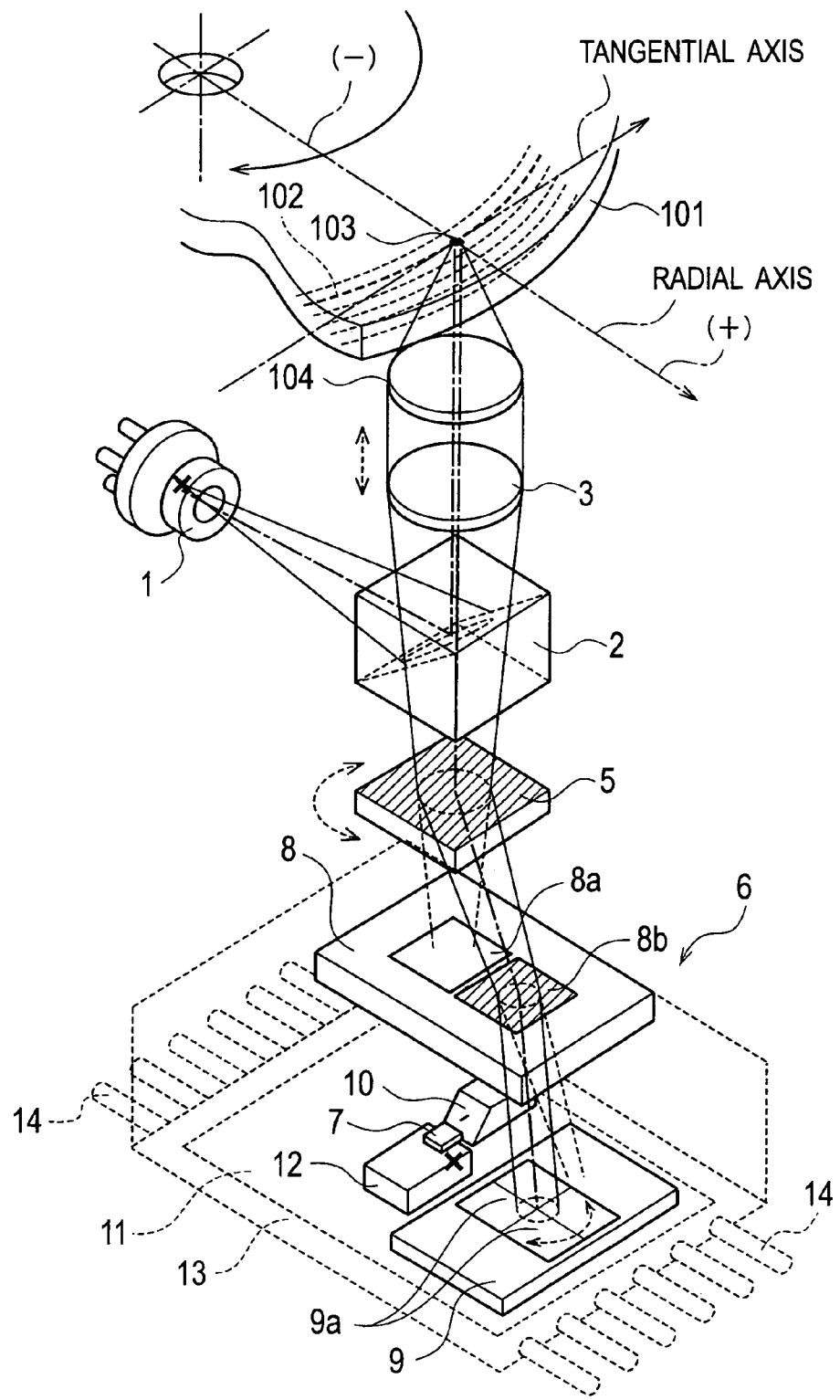
FIG. 1 is a perspective view showing the constitution of an optical pickup of the present invention.

FIG. 1 is a perspective view showing the constitution of an optical pickup of the present invention.

As shown in FIG. 1, the optical pickup of the present invention irradiates convergent light 103 to an information recording medium 101, such as optical disc, having information signals recorded along a recording track 102 and detects the reflecting light of the convergent light 103 from the information recording medium 101 to read the information signals. Alternatively, the optical pickup of the present invention irradiates the convergent light 103 to the information recording medium 101 to write information signals thereon.

This optical pickup includes a first laser beam light source 1 emitting a light flux of a first wavelength to be irradiated on the information recording medium 101. An outward light of the first wavelength emitted from the first laser beam light source 1 is transmitted through an optical-path composition prism 2 and a collimator lens 3, and then incident on an objective lens 104. The objective lens 104 irradiates the incident outward light of the first wavelength on the information recording medium 101, as the convergent light 103.

In the optical pickup, the outward light of the first wavelength irradiated on the information recording medium 101 is reflected thereon and then returned to the optical-path composition prism 2 through the objective lens 104 and the collimator lens 3, as a homeward light. In the optical-path composition prism 2, the homeward light of the first wavelength is diverged from an optical path for the first laser beam light source 1. The backward light of the first wavelength via the optical-path composition prism 2 is transmitted through a diffraction grating 5.

The optical pickup of the present invention is provided with an optical device 6 in which light-receiving and light-emitting elements are integrated. In the optical device, there are many optical elements including the light-emitting elements and the light-receiving elements, which are arranged with each other in a fixed positional relationship and constructed in an integrated fashion.

The optical device 6 includes a flat lead frame 11 formed by a metal substrate, a second laser beam light source 7 emitting a light flux of a second wavelength, a hologram element 8 and a light-receiving element 9. The light source 7, the hologram element 8 and the light-receiving element 9 are fixed on the lead frame 11 integrally. In detail, the second laser beam light source 7 is constructed to emit a laser beam having the second wavelength (e.g. 650 nm in waveband) and also mounted on a sub-mount 12 formed by a semiconductor substrate of Si (silicon) etc. This sub-mount 12 is adhesively-secured on the lead frame 11, together with a reflecting prism 10 and the light-receiving element 9. The lead frame 11 is provided with a plurality of lead terminals 14 for power supply to the second laser beam light source 7 and for signal output from the light-receiving element 9. The outward light of the second wavelength emitted from the second laser beam light source 7 is reflected by a slanted surface of the reflecting prism 10 on the lead frame 11 and then emitted out of the optical device 6.

The lead frame 11 is arranged in a resinous package 13 fixedly. The hologram element 8 is fixed in position in the resinous package 13. The above-mentioned second laser beam light source 7, the reflecting prism 10, the hologram element 8 and the light-receiving element 9 are integrally fixed in the package 13 while stabilizing a mutual light receiving-and-emitting relationship, constituting an integrated device.

The outward light of the second wavelength is transmitted through the hologram element 8 and the diffraction grating 5 and then irradiated to the information recording medium 101 through the optical-path composition prism 2, the collimator lens 3 and the objective lens 104, in sequence. Besides the outward light of the second wavelength, the backward lights of the first and second wavelength reflected on the information recording medium 101 are transmitted through the hologram element 8 after passing through the diffraction grating 5. Then, the light-receiving element 9 detects the backward lights of the first and second wavelengths transmitted through the hologram element 8.

In the optical pickup, the first wavelength may be 405nm in waveband to meet both BD standard and HD-DVD standard, while the second wavelength may be 650 nm in waveband to meet DVD standard.

Here, the waveband of 405 nm typically designates a wavelength range of approx. 400 nm to 410 nm, while the waveband of 650 nm typically designates a wavelength range of approx. 650 nm to 670 nm. That is, it may be understood that the wavelength ranges established for evaluation pickups under respective disc standards are not always identical to each other, but the wavelength ranges are those generally obtained by recording and reproducing equipments commercially available in the marketplace.

In the optical pickup, the optical-path composition prism 2 allows an incidence of the outward light of the first wavelength and also conducts it to the information recording medium 101. In addition, the optical-path composition prism 2 allows an incidence of the backward light of the second wavelength in a different direction from the outward light of the first wavelength and also conducts the incident backward light to the information recording medium 101. Still further, the optical-path composition prism 2 is adapted so as to conduct the backward lights of the first and second wavelengths, which have been reflected by the information recording medium 101, to the light-receiving element 9 through the diffraction grating 5 and the hologram element 8.

With the use of the optical-path composition prism 2, the diffraction grating 5 is arranged in the optical path of the outward light of the second wavelength from the second laser beam light source 7 toward the information recording medium 101 and also arranged outside the optical path of the outward light of the first wavelength from the first laser beam light source 1 toward the information recording medium 101. The hologram element 8 is also arranged in the optical path of the outward light of the second wavelength and outside the optical path of the outward light of the first wavelength.

For the optical-path composition prism 2, as shown in FIG. 1, there may be used an element that reflects the outward light of the first wavelength thereby to lead to the information recording medium 101, allows a transmission of the outward light of the second wavelength thereby to lead to the medium 101, and that allows a transmission of the backward lights of the first and second wavelengths both reflected by the medium 101 thereby to lead to the light-receiving element 9 through the diffraction grating 5 and the hologram element 8.

In this case, as the optical-path composition prism 2, it is possible to use a prism functioning as a polarization beam splitter that allows P-polarized light to be transmitted and reflects S-polarized light with respect to the first wavelength, and also functioning as a transparent member that allows P-polarized light and S-polarized light to be transmitted with respect to the second wavelength, that is, a prism having the characteristics of spectral transmittance.

Alternatively, the optical-path composition prism 2 may be formed by an element that allows a transmission of the outward light of the first wavelength thereby to lead to the information recording medium 101, reflects the outward light of the second wavelength thereby to lead to the medium 101, and that reflects the backward lights of the first and second wavelengths both reflected by the medium 101 thereby to lead to the light-receiving element 9 through the diffraction grating 5 and the hologram element 8.

In this case, as the optical-path composition prism 2, it is possible to use a prism functioning as a polarization beam splitter that allows P-polarized light to be transmitted and reflects S-polarized light with respect to the first wavelength, and also functioning as a total reflecting prism that reflects P-polarized light and S-polarized light with respect to the second wavelength, that is, a prism having the characteristics of spectral transmittance.

Still further, the optical-path composition prism 2 may be formed by a dichroic prism having the characteristics of spectral transmittance, which functions as a transparent member whose transmissivity and reflectivity fall within the range of approx. 30 to 70% with respect to the first wavelength and whose transmissivity is more than approx. 80% with respect to the second wavelength.

The diffraction grating 5 is adapted so as to diffract the backward light of the first wavelength at a predetermined angle and allow the outward and backward lights of the second wavelength to be transmitted without diffraction. Preferably, the diffraction grating 5 is capable of adjusting its positional relationship relative to the optical device 6.

For the diffraction grating 5, there may be selected any one of a wavelength-selection type diffraction grating, a polarization-selection type diffraction grating and a blazed diffraction grating.

As the diffraction grating 5 of wavelength-selection type, it is possible to use a grating whose path length difference between concavo-convex portions of gratings is equal to the substantially-integral multiple of the second wavelength and whose diffraction efficiency for the second wavelength is substantially zero.

As the diffraction grating 5 of polarization-selection type, it is possible to use a grating whose substantial path length difference between the concavo-convex portions of gratings is either zero or equal to the substantially-integral multiple of the second wavelength in the polarizing direction when at least one of the outward light and the backward light passes and whose diffraction efficiency for the second wavelength is substantially zero.

As the diffraction grating 5 of blazed type, it is possible to use a grating whose diffraction efficiency for producing one flux (of at least ± first-order diffraction lights of the backward light of the second wavelength) toward a second area 8b of the hologram element 8 gets larger than the diffraction efficiency for producing the other flux.

The hologram element 8 is provided in the form of an integral transparent member including a first area 8a and the second area 8b.

In the hologram element 8, the first area 8a includes a light-flux diameter of the backward light of the second wavelength and is adapted so as to diffract the backward light of the second wavelength and also irradiate one of ± first-order diffraction lights to a light-receiving area of the light receiving element 9, in convergence.

On the other hand, the second area 8b includes a light-flux diameter of the backward light of the first wavelength diffracted by the diffraction grating 5 at the predetermined angle and is adapted so as to diffract the backward light of the first wavelength at a reversed-polarity angle to the first area 8a and also irradiate one of ± first-order diffraction lights to the light-receiving area of the light receiving element 9, in convergence.

Then, the light receiving element 9 receives the backward light of the first wavelength and the backward light of the second wavelength through light-receiving area 9a on the same plane and then outputs detection signals due to photoelectric conversion.

Note that in case of using the diffraction grating 5 of wavelength-selection type in the optical pickup, the efficiency of the diffraction grating 5 has a wavelength dependency and therefore, it becomes zero when the path length difference between the concavo-convex portions of gratings is equal to one wavelength or the integral multiple of the wavelength, due to a grid depth of the grating 5. If making use of such characteristics of the diffraction grating 5, then it becomes possible that no diffraction is produced in the light flux of the second wavelength, while a diffraction is produced in only the light flux of the other wavelength unequal to the integral multiple of the second wavelength, namely, the light flux of the first wavelength, whereby the outward light of the first wavelength can be led to the second area 8b of the hologram element 8.

Consequently, two outward lights of different wavelengths can be led to the light-receiving element 9 through different areas 8a, 8b of the hologram element 8, respectively.

The backward light of the first wavelength generates a zero-order diffraction light at the diffraction grating 5. Nevertheless, the resulting zero-order diffraction light is then transmitted through the first area 8a of the hologram element 8 toward the second laser beam light source 7. Alternatively, even if the resulting zero-order diffraction light is diffracted by the first area 8a, there is no possibility that the zero-order diffraction light is headed for the light-receiving element 9. Thus, it is possible to avoid an optical crosstalk appropriately.

Suppose that for instance a polarization-selection type grating is adopted as the diffraction grating 5. Then, if only it is established that respective polarization directions of the backward light of the first wavelength and the backward light of the second wavelength bisect each other at right angles, it is easy to construct the optical pickup so as to produce diffraction only in the backward light of the first wavelength. Any direction could be established as the polarization directions. For instance, by interposing a half-wavelength plate or the like, it is possible to easily rotate the polarization directions against the initial polarization state of the laser beam light source.

If a brazed type diffraction grating is adopted for the diffraction grating 5, then it is possible to allow the outward light of the first wavelength to mainly produce a diffraction light in a radial (+) direction (i.e. a direction of + along the radial axis in FIG. 1), improving the light-receiving efficiency of the outward light.

Figure 3:
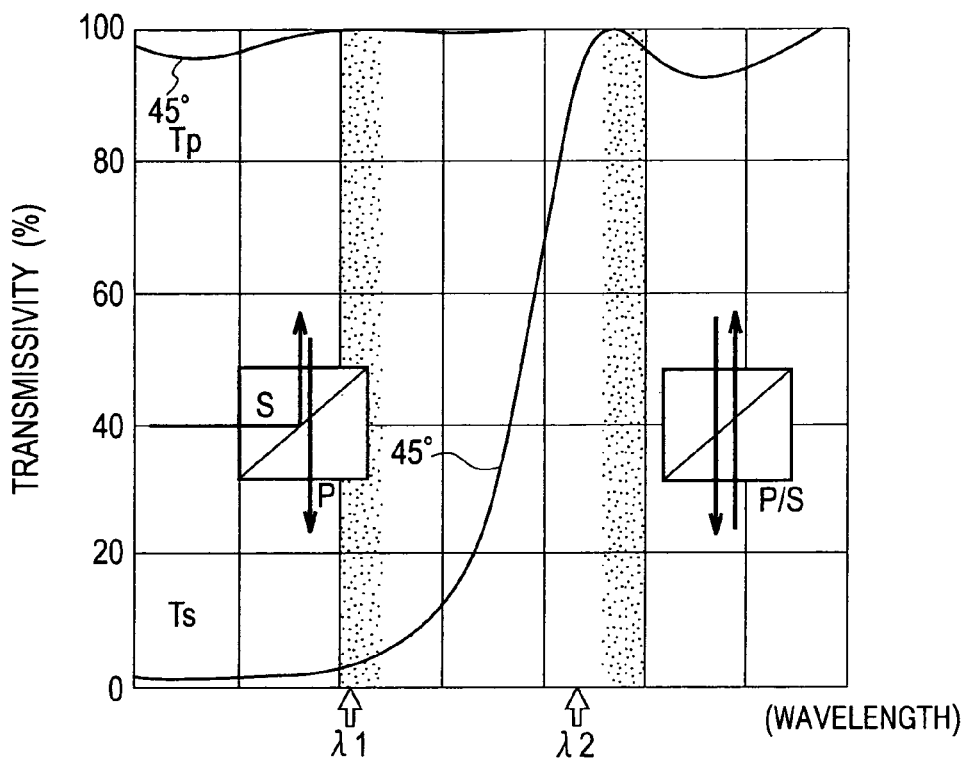
FIG. 3 is a graph showing the optical characteristic of an optical-path composition prism in the optical pickup of the present invention.

FIG. 3 is a graph showing the optical characteristic of the optical-path composition prism.

Suppose that in this optical pickup the optical-path composition prism 2 functions as a polarization beam splitter with respect to the first wavelength. In this case, for example, it is possible to optionally alter the wavelength of the horizontal axis by appropriately changing a film thickness of the reflecting film, as shown in FIG. 3. If the first wavelength λ1 and the second wavelength λ2 of FIG. 3 are set to 405 nm and 650 nm respectively, then it is possible to realize the optical characteristic suitable for the optical-path composition prism 2 usable in common with "BD" standard and "DVD" standard.

Figure 4:
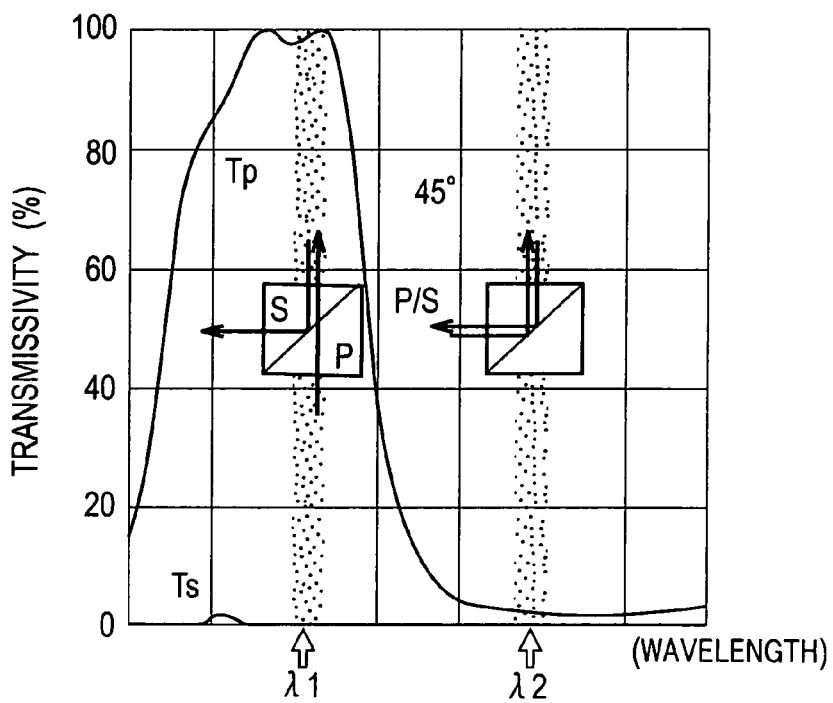
FIG. 4 is a graph showing another example of the optical characteristic of the optical-path composition prism in the optical pickup of the present invention.

FIG. 4 is a graph showing another example of the optical characteristic of the optical-path composition prism.

Suppose that in this optical pickup the optical-path composition prism 2 is formed by a non-polarization type dichroic prism. In this case, as shown in FIG. 4, the resulting optical-path composition prism 2 serves as a half-mirror against the light flux of the first wavelength λ1 and exhibits wavelength selectivity allowing a reflection of substantially-full quantity of light against the light flux of the second wavelength λ2.

[Constitution of Optical Pickup 2]

In the present invention, the optical pickup may be provided, besides the first and second laser beam light sources 1, 7, with a third laser beam light source emitting light flux of the third wavelength to be irradiated to the information recording medium 101. For instance, this third wavelength may be 780 nm in waveband to meet "CD".

Here, the waveband of 780 nm typically designates a wavelength range of approx. 780 nm to 800 nm. Similarly to the above-mentioned cases of 405 nm and 650 nm in waveband, it may be understood that the wavelength ranges established for evaluation pickups under these disc standards are not always identical to each other, but the wavelength range is one generally obtained by recording and reproducing equipments commercially available in the marketplace.

The third laser beam light source is arranged integrally with or adjacent to the second laser beam light source 7. That is, the third laser beam light source is fixed with the light-receiving element 9 and the hologram element 8 integrally, constituting the optical device 6 (two-wavelength device).

On the outward route for the information recording medium 101, the light flux of the third wavelength from the third laser beam light source shares a substantially-identical optical path with the outward light of the second wavelength. Then, the backward light of the third wavelength reflected by the information recording medium 101 is diffracted by the first area 8a of the hologram element 8 and sequentially led to the light-receiving element 9.

[Constitution of Optical Pickup (3)]

Figure 5:
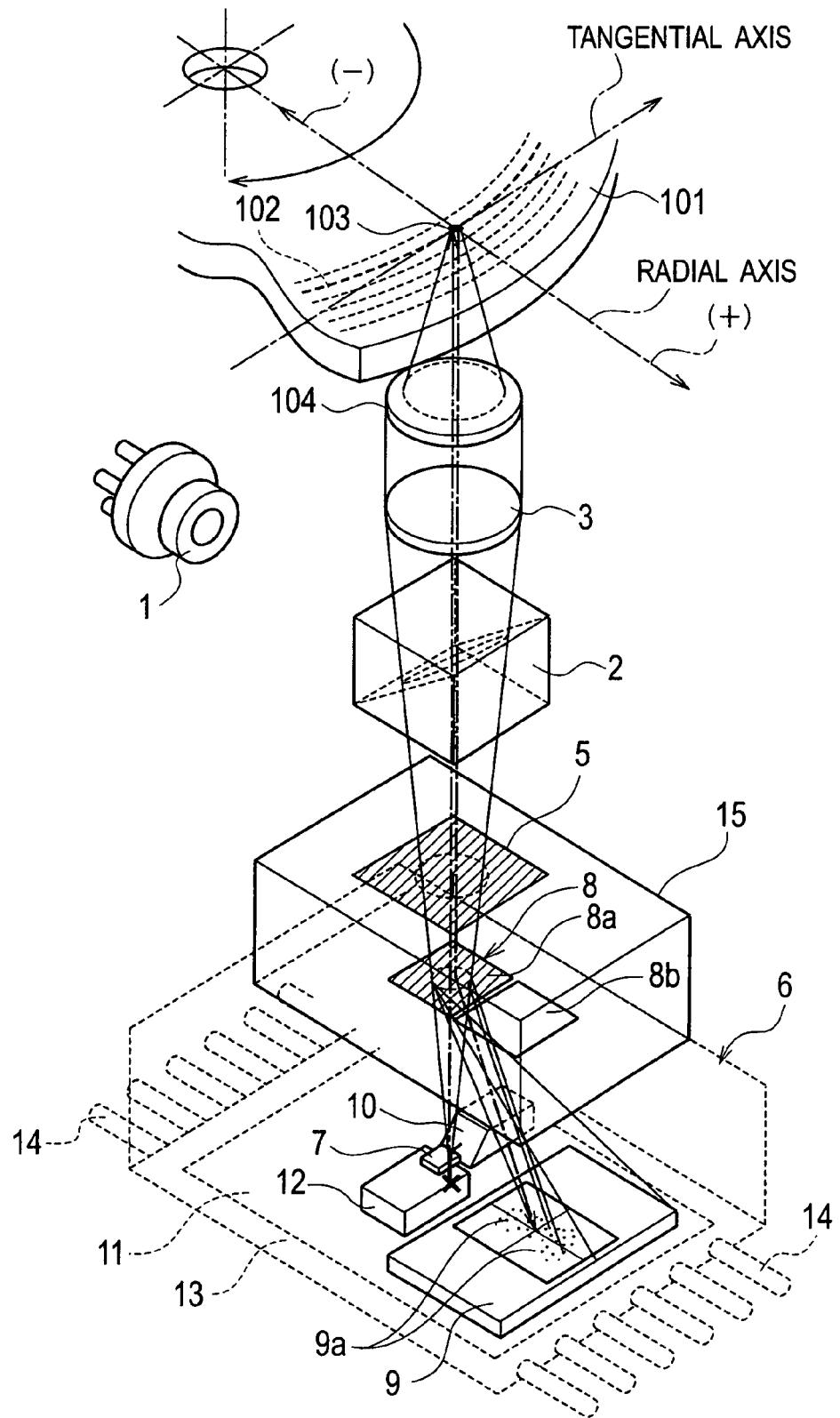
FIG. 5 is a perspective view showing another example the constitution of an optical pickup constructed by using the optical device of the present invention.

FIG. 5 is a perspective view showing another example of the constitution of the optical pickup of the present invention, which is constructed with the use of the optical device of the present invention.

Figure 7:
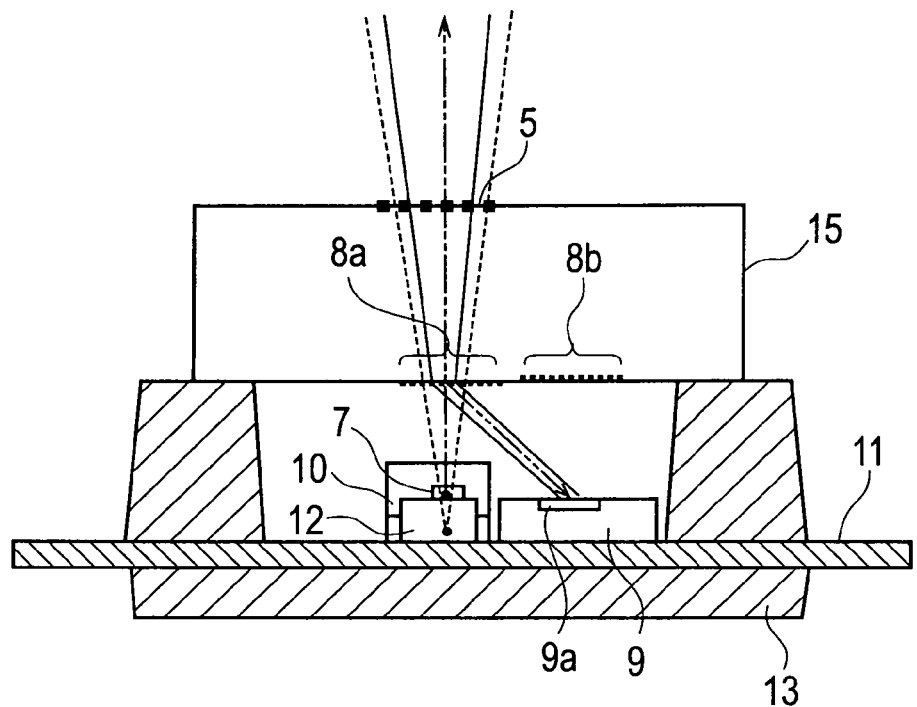
FIG. 7 is a longitudinal sectional view showing the other example the constitution of the optical pickup constructed by using the optical device of the present invention.

FIG. 7 is a longitudinal sectional view showing the other example of the constitution of the optical pickup using the optical device of the present invention.

As shown in FIG. 5, the optical pickup of the present invention may be provided with a parallel plate member 15 having its one surface equipped with the diffraction grating 5 and the other surface equipped with the hologram element 8. As also shown in FIG. 7, the parallel plate member 15 is fixed with the resinous package 13 of the optical device 6. In this case, the second laser beam light source 7, the diffraction grating 5, the hologram element 8 and the light-receiving element 9 are integrated with each other in a fixed positional relationship to constitute the optical device 6 of the present invention.

In the optical pickup of the present invention, once it is assembled, no adjustment is basically required since respective optical systems for receiving and emitting lights are integrated with each other with high accuracy. As similar to a normal bulk-pickup optical system, regarding the positioning of the first laser beam light source 1 as a separated constituent, it has only to be fixed to an appropriate member (not shown) after either the optical device 6 or the first laser beam light source 1 has been adjusted in position biaxially or triaxially.

In the optical pickup, as the hologram element 8 sensitive to wavelength is designed so as to be exclusive to respective wavelengths in the backward optical path and the light-receiving element 9 is used in common with respective wavelength, it is possible to bring an optical system for two or three wavelengths appropriately.

In this optical pickup, the emission wavelengths of the laser beam light sources 1, 7 vary due to manufacturing error and temperature. For instance, if the mission wavelength is shifted to the side of long wavelength, then an angle of diffraction gets increased in the diffraction grating of periodical structure. In case of using the first wavelength, however, such a wavelength variation can be canceled since the diffraction angle is shifted to the side of radial (+) at the diffraction grating 5, while the diffraction angle is shifted to the side of radial (−) at the hologram element 8. This optical device is also applicable to e.g. astigmatic method of dividing a spot of backward light biaxially. Thus, it is possible to adopt the astigmatic method which has been regarded as being difficult for the conventional optical device using a diffraction grating.

Also in this optical pickup, as similar to the optical pickup in the above-mentioned embodiment, there may be selected any one of a wavelength-selection type diffraction grating, a polarization-selection type diffraction grating and a blazed diffraction grating as the diffraction grating 5. In addition, the effects of the optical pickup where the diffraction grating 5 is formed by any of a variety of diffraction gratings mentioned above are similar to those of the above-mentioned embodiment.

[Operation of Optical Pickup 1]

In the optical pickup of the present invention, its operation of reproducing a "DVD" disc as the information recording medium corresponding to the second wavelength will be described below.

The outward light of the second wavelength emitted from the second laser beam light source 7 is transmitted through the hologram element 8 while gradually broadening as a diverging light, as shown in FIGS. 1, 5 and FIG. 7. Although the outward light of the second wavelength may be accompanied with a very slight loss of diffraction at the hologram element 8, a great part of the outward light is transmitted through the hologram element 8, as a zero-order transmitted light which is free of the influence of diffraction.

Subsequently, the outward light of the second wavelength is transmitted through the diffraction grating 5 and the optical-path composition prism 2. Here, the outward light of the second wavelength is also free of the influence on diffraction and reflection, except for a transmission loss in light intensity. That is, the outward light of the second wavelength is transmitted through the diffraction grating 5 and the optical-path composition prism 2 while being subjected to only the action of transmissive flat plates therefrom. Thereafter, the transmitted outward light of the second wavelength is changed to a generally-parallel light by the collimator lens 3 and successively incident on the objective lens 104. The objective lens 104 comprises a "DVD/BD" compatible lens or a "CD/DVD/BD" compatible lens. In reproducing a "DVD" disc, the objective lens 104 forms, by its area of 0.6 in NA (numerical aperture, a condensing spot 103 of diffraction limit on the signal recording surface through a transparent substrate (thickness: 0.6 mm) of the "DVD" disc.

In spite of tracking displacement due to surface-fluctuation and decentering accompanied with the rotation of the information recording medium 101, the condensing spot 103 is always focused on the recording track owing the focus-servo operation and the tracking-servo operation with a not-shown biaxial actuator.

The outward light is reflected on the recording track, so that the resulting backward light (reflecting light) proceeds to the objective lens 104. In this backward light, its reflected light intensity does reflect signals recorded in the recording track.

In this way, the backward light is incident on the optical system of the optical pickup in the opposite course to the outward light.

The backward light of the second wavelength is transmitted through the collimator lens 3, the optical-path composition prism 2 and also the diffraction grating 5. Then, the backward light of the second wavelength via the diffraction grating 5 is incident on the first area 8a of the hologram element 8. Then, the backward light of the second wavelength is diffracted by the first area 8a of the hologram element 8, so that the resulting +first-order diffraction light is headed for the outer circumference of the information recording medium 101 [i.e. the direction of radial (+) in the figure] in comparison with the optical path for the second laser beam light source 7 (zero-order light).

Here, the expression "radial (+) direction" means the outer circumferential direction of the information recording medium 101 about the light condensing spot 103 as an origin, that is, a direction of (+) along the radial axis shown in FIG. 1. On the contrary, the other expression "radial (−) direction" means the inner circumferential direction of the information recording medium 101 about the light condensing spot 103 as an origin, that is, a direction of (−) along the radial axis shown in FIG. 1.

Note that besides the function of bifurcating the backward light, the hologram element 8 may be further divided to sub-areas in order to produce a focus-error signal and a tracking-error signal both necessary for respective servo operations, the sub-areas having respective lens effects different from each other.

The backward light of the second wavelength diffracted by the first area 8a is incident on the optical device 6 and then received by the light-receiving area 9a on the same plane of the light-receiving element 9. The light-receiving area 9a of the light-receiving element 9 is arranged in a predetermined position in the vicinity of a conjugate point of the emission point of the second laser beam light source 7. The light-receiving area 9a of the light-receiving element 9 is defined on the substrate of the light-emitting element and divided into a plurality of sub-areas by parting lines on the light-receiving area.

The light-receiving element 9 receives the backward light of the second wavelength through the light-receiving area 9a and outputs detection signals every sub-areas as a result of photoelectric conversion. These detection signals are calculated and amplifies by an integrated circuit formed on the substrate of the light-receiving element 9. Calculating of the detection signals every sub-areas produces reproducing signals for contents recorded in the information recording medium 101 and respective error signals. In this optical pickup, a known general method may be adopted as the method of generating the error signals. These signals are generated outside and provided for the reproducing operation and the servo operations in an optical-disc device, such as disc player and disc recorder, accomplishing a stable signal reproducing operation of the device.

Alternatively, the optical pickup may generate error signals in accordance with the method discloses in the above-mentioned patent document [Japanese Patent Publication Laid-open No. 2007-200471 (Japanese Patent Application No. 2006-018786)]. That is, the first area 8a of the hologram element 8 is divided into eight areas by a first parting line on the optical axis of the backward light and identical to the tangential axis parallel to the recording track in optical mapping, a second parting line on the optical axis of the backward light and identical to the radial axis perpendicular to the recording track in optical mapping, and third and fourth parting lines parallel to and mutually symmetrical with respect to the second parting line.

In the first area 8a, the so-divided eight areas do constitute, on one side of the second parting line, first and second area groups each consisting of two areas and diagonally opposing about a cross point between the first parting line and the third (or the fourth) parting line and also constitute, on the other side of the second parting line, third and fourth area groups each consisting of two areas and diagonally opposing about a cross point between the first parting line and the fourth (or the third) parting line.

In the same area group, hologram constitutes a part of the identical curve group that generates diffraction lights having identical continuous wave-fronts. Throughout the first to the fourth area groups, the direction of each group to diffract zero-order and ± first-order diffraction lights generally coincide with an equivalent direction to the radial axis. Further, the first to the fourth area groups generate two groups of diffraction lights whose diffraction angles to the axis of the backward light are different from each other. For respective diffraction lights in the same group whose diffraction angles to the axis of the backward light are equal to each other, the hologram element 8 serves to apply lens powers, which are different from each other in the equivalent direction to the tangential axis, to these diffraction lights to form convergent lights whose convergent angles are different from each other.

When the convergent light irradiated to the information recording medium 101 is focused on it, the light-receiving element 9 contains, in at least the first to the fourth area groups, a transit area of two groups of diffraction lights diffracted to the same direction to the optical axis of the backward light. Furthermore, the light-receiving element 9 is apart from the hologram element 8 along the direction of the optical axis so that such two groups of diffraction lights are separated from each other spatially. In addition, the light-receiving element 9 is positioned on a plane between one tangential focal line of one diffraction light of the two groups diffraction lights and another tangential focal line of the other diffraction light of the two groups diffraction lights and also divided into four light-receiving areas generating four types of photoelectric conversion outputs proportional to any irradiation intensity of the diffraction lights by a first parting line parallel to the equivalent direction to the tangential axis and positioned at the substantial midpoint between two groups of diffraction lights and a second parting line on the optical axis of the backward line and parallel to the equivalent direction to the radial axis.

When the convergent light irradiated to the information recording medium 101 is focused on it, four light-receiving areas of the light-receiving element 9 outputs photoelectric conversions corresponding to four-quadrant components, which are obtained by dividing the backward light from the information recording medium 101 by the tangential axis and the radial axis, since profile lines corresponding to the third and fourth parting lines of the first area 8a of the hologram element 8 in the diffraction light group coincide with the second parting line of the light-receiving element 9.

Optically, this optical pickup has a feature of "SSD method" since the second parting line, which may be positioned in the light-receiving spot in the light-receiving element 9, is set parallel to the radial axis in optical mapping. In addition, with the possibility of detecting respective intensity-components without any lack and independently of each other, which could be obtained by dividing the intensity of the backward light from the information recording medium 101 into four quadrants by the radial axis and the tangential axis, the optical pickup is capable of detecting the focus-error signal regarded as "astigmatic method" arithmetically and logically.

[Operation of Optical Pickup 2]

In the optical pickup of the present invention, its operation of reproducing a "BD" disc or a "HD-DVD" disc as the information recording medium corresponding to the first wavelength will be described below.

Figure 2:
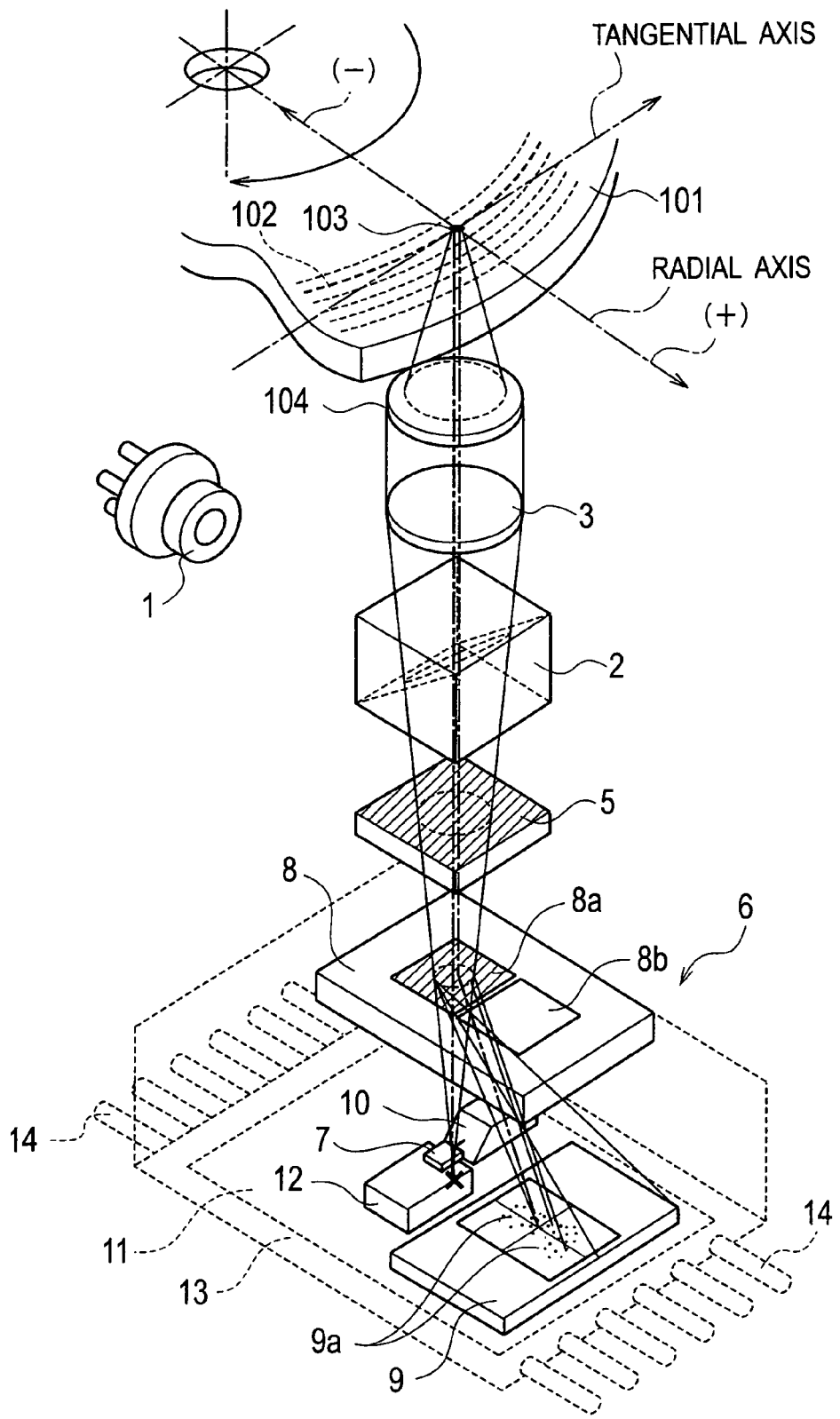
FIG. 2 is a perspective view explaining the operation of the optical pickup of the present invention to reproduce an information recording medium corresponding to a first wavelength.
Figure 6:
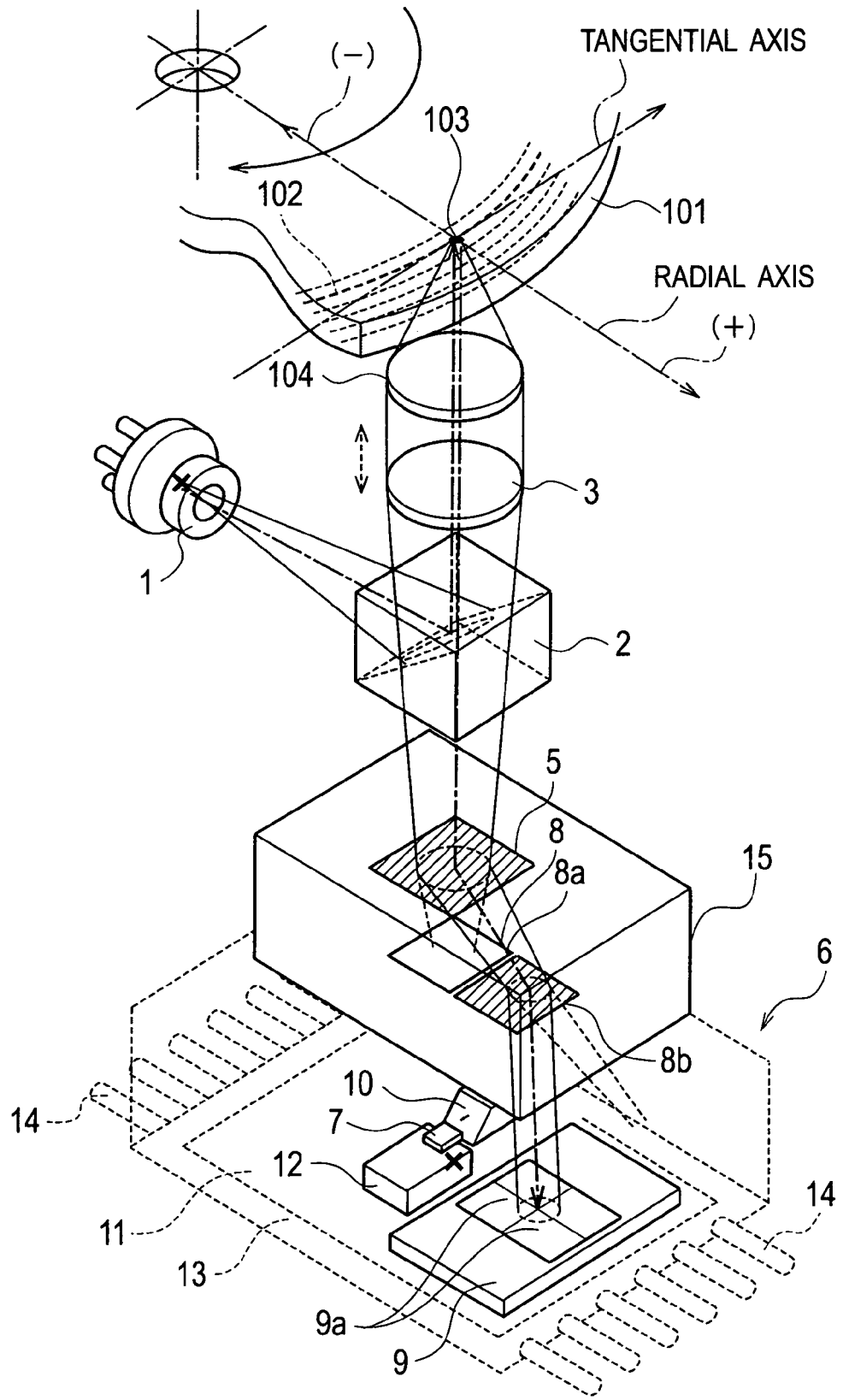
FIG. 6 is a perspective view explaining the operation of reproducing the information recording medium corresponding to the first wavelength in the other example the constitution of the optical pickup constructed by using the optical device of the present invention.

FIG. 2 is a perspective view explaining the operation of the optical pickup of the present invention to reproduce an information recording medium corresponding to a first wavelength;

FIG. 6 is a perspective view explaining the operation of reproducing the information recording medium corresponding to the first wavelength in the other example the constitution of the optical pickup constructed by using the optical device of the present invention.

Figure 8:
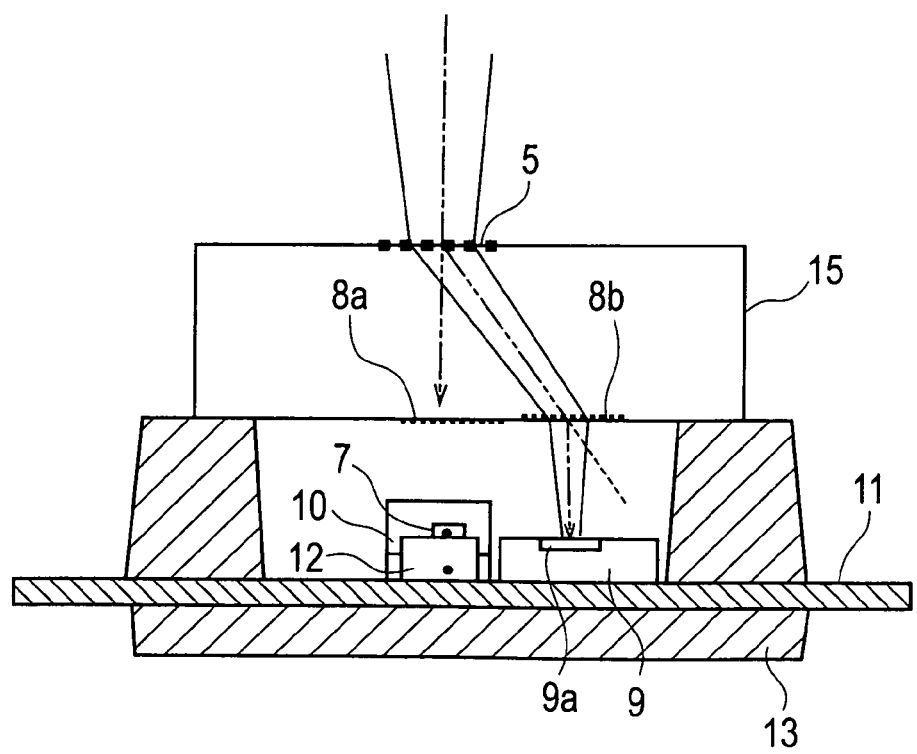
FIG. 8 is a longitudinal sectional view explaining the operation of reproducing the information recording medium corresponding to the first wavelength in the other example the constitution of the optical pickup constructed by using the optical device of the present invention.

FIG. 8 is a longitudinal sectional view explaining the operation of reproducing the information recording medium corresponding to the first wavelength in the other example the constitution of the optical pickup constructed by using the optical device of the present invention.

As shown in FIGS. 2, 6 and 8, the first laser beam light source 1 has an oscillation wavelength of the first wavelength (e.g. wavelength range of 400 nm) and is sealed up in a metallic can package air-tightly in order to avoid its deterioration due to atmospheric exposure. The outward light of the first wavelength emitted from the first laser beam light source 1 is incident on the optical-path composition prism 2.

The outward light of the first wavelength constitutes S-polarized light with respect to the reflecting surface of the optical-path composition prism 2 and is substantially total-reflected by the reflecting surface. On the emitting surface (i.e. side of the collimator lens 3) of the optical-path composition prism 2, there is a quarter wavelength plate (not shown) by which the outward light of the first wavelength is polarized circularly.

The circularly-polarized outward light of the first wavelength is transmitted through the collimator lens 3 and the objective lens 4 to form a light condensing spot 103. In reproducing a "BD" disc, the objective lens 104 utilizes an area of 0.85 in NA (numerical aperture) and forms a diffraction-limited light condensing spot 103 on the signal recording surface through a transparent cover layer [thickness: 0.1 mm (100 μm)] of the "BD" disc. The objective lens 104 is provided with a wavelength-selective diffraction-orbicular zone and a wavelength-selective aperture (both not shown), so that the light fluxes in the whole area of the lens are utilized to reproduce the "BD" disc. For aberration correction, the collimator lens 3 is properly moved in the direction of an optical axis by a not-shown movable mechanism.

The backward light of the first wavelength reflected by the information recording medium 101 is transmitted through the objective lens 101 and the collimator lens 3 and led to the optical-path composition prism 2. As the backward light of the first wavelength is polarized to P-polarized light by the quarter wavelength plate before being incident on the optical-path composition prism 2, the backward light is substantially totally-transmitted through the reflecting surface of the optical-path composition prism 2 and subsequently incident on the diffraction grating 5.

The diffraction grating 5 has the action of selecting wavelength brought by the technique of adjusting grooves in depth. At the diffraction grating 5, the backward light of the first wavelength is diffracted differently from the backward light of the second wavelength. The backward light of the first wavelength diffracted by the diffraction grating 5 diverges as + first-order diffraction light, so that it is converted in optical path to the radial (+) direction.

The backward light of the first wavelength diffracted by the diffraction grating 5 reaches the second area 8b of the hologram element 8. By appropriately establishing a diffraction angle by means of the groove cycle of the diffraction grating 5 and also appropriately establishing an interval between the diffraction grating 5 and the hologram element 8, it is possible to make a distance between the backward light of the first wavelength and the backward light of the second wavelength at the hologram element 8 more than their flux diameters, preferably, approximately half as many again as their flux diameters, whereby these fluxes can be separated from each other perfectly. Then, in the hologram element 8, there is produced an area containing no overlapping portion where the first area 8a and the second area 8b are completely separated from each other. Therefore, even when forming a relief grating on the same plane of the element, it is possible to design respective areas independently of each other optimally.

In the second area 8b of the hologram element 8, −first-order diffraction, that is, an angular variation in the radial (−) direction is applied to the backward light of the first wavelength and successively, it is incident on the optical device 6. That is, in the second area 8b, there is again performed the optical-path conversion in a direction to cancel the diffraction angle in the radial (+) direction applied by the diffraction grating 5. Thus, by setting the diffraction angle at the second area 8b to a predetermined angle in the radial (−) direction, the backward light of the first wavelength is received by the light-receiving area 9a of the light-receiving element 9, as similar to the backward light of the second wavelength.

The light-receiving element 9 receives the backward light of the first wavelength through the light-receiving area 9a and outputs detection signals every sub-areas as a result of photoelectric conversion. These detection signals are calculated and amplifies by an integrated circuit formed on a substrate for the light-receiving element 9. Calculating of the detection signals every sub-areas produces reproducing signals for contents recorded in the information recording medium 101 and error signals. These signals are generated outside and provided for the reproducing operation and the servo operations in an optical-disc device, such as disc player and disc recorder, accomplishing a stable signal reproducing operation of the device.

In prior art, there is proposed an optical pickup having an identical hologram element and an identical light-emitting element in common with the flux in the waveband of 780 nm for reproducing "CD" disc and the flux in the waveband of 650 nm for reproducing "DVD" disc. In fact, however, as the wavelength of the flux in the waveband of 405 nm for reproducing "BD" disc differs greatly from that of the flux for reproducing "CD" disc or "DVD", it has been difficult to share a diffraction element or a hologram element severely-dependent on wavelength. On the contrary, according to the optical pickup of the present invention, it is possible to share the light-receiving element 9 in common with the first wavelength and the second wavelength because the backward light of the first wavelength and the backward light of the second wavelength are separated from each other by the diffraction grating 5 and in addition, the hologram element 8 has areas established exclusively to the backward lights of respective wavelengths and also produces a diffraction to cancel the diffraction by the diffraction grating 5.

Regarding the flux of the second wavelength, as its light receiving/emitting optical systems are integrated with high accuracy there is no need of adjustment in assembling the optical pickup of the invention. While, regarding the flux of the first wavelength, as the laser beam light source 1 is arranged independently of the optical device 6, adjustment is required in assembling the optical pickup. Here, as the diffraction grating 5 is also arranged independently of the optical device 6, rotating of the diffraction grating 5 about the optical axis at a minute angle allows the incident position of the backward light on the light-receiving area 9s of the light-receiving element 9 to be adjusted with ease. Such an adjustment could be performed even after the optical device 6 is fixed to a not-shown casing of the optical pickup.

It is noted that since the hologram element 8 is formed by an integral component having the first area 8a and the second area 8b, it is difficult to optimize the diffracting directions of the light fluxes of respective wavelengths by adjusting the position of the hologram element 8.

Thus, in the optical pickup of the invention, the backward light of the first wavelength and the backward light of the second wavelength have their respective optical paths separated from each other and in addition, the diffracting grating 5 is capable of rotational adjustment. Therefore, it is possible to construct an optical system suitable for two or three wavelength with ease.

In general, if the wavelength of the light source varies due to manufacturing error and temperature change, then the diffraction angles at the diffraction grating 5 and the hologram element 8 also changes. For instance, if the wavelength of the light source is shifted so as to get longer, then the diffraction angle at the diffraction grating 5 of periodical structure gets increased. According to the optical pickup of the present invention, as the diffraction grating 5 acts to shift the diffraction angle to the radial (+) direction while the hologram element 8 acts to shift the diffraction angle to the radial (−) direction, it is possible to cancel the change in diffraction angle due to a variance in wavelength of the light source. For instance, the constitution is also applicable to astigmatic method for dividing the backward light biaxially. Thus, according to the present invention, it is possible to adopt the astigmatic method, which has been regarded as being difficult to use in the diffraction optical system.

In this way, according to the present invention, as optical systems and optical components can be remarkably commoditized in not only "CD" disc and "DVD" disc but -the other information recording medium 101 using a short-wavelength (e.g. waveband of 450 nm) light source, such as "BD" disc, it is possible to provide an optical pickup which is stable in characteristics while realizing its miniaturization, simplification and price-reduction. In addition, owing to the adoption of the hologram element, it is possible to prevent the number of components from being increased, accomplishing simplification of the constitution, its miniaturization and a reduction in manufacturing cost. Further, it is possible to lighten the dependency of a diffraction element on wavelength variation, ensuring high reliability.

Regardless of whether civilian use or professional use, the optical device and the optical pickup of the present invention are applicable to a system using optical discs and particularly, the invention is broadly applicable to compatible reproducing/recording devices for several standards (e.g. optical-disc drive, player, recorder, storage unit, etc.) using two to three wavelengths. In addition, with the realization of miniaturization, weight-reduction, price-reduction and high reliability, the optical device and the optical pickup of the present invention can be utilized in various applications, such as vehicle installation and portable use.

Finally, it will be understood by those skilled in the art that the foregoing descriptions are nothing but embodiments and various modifications of the disclosed optical pickup and device and therefore, various changes and modifications may be made within the scope of claims.

What is claimed is:

1. An optical pickup for irradiating a convergent light to an information recording medium either to detect a reflecting light produced by reflecting of the convergent light on the information recording medium thereby reading information signals recorded along a recording track of the information recording medium or to write the information signals to the information recording medium, the optical pickup comprising:

a first laser beam light source emitting a light flux of a first wavelength to be irradiated to the information recording medium;

a diffraction grating disposed in an optical path of a backward light reflected by the information recording medium; and an optical device having:
 a second laser beam light source emitting a light flux of a second wavelength to be irradiated to the information recording medium through the diffraction grating;
 a hologram element arranged in an optical path of backward lights produced since the light fluxes of the first wavelength and the second wavelength are reflected by the information recording medium and subsequently transmitted through the diffracting grating; and
 a light-receiving element for detecting the backward lights, the second laser beam light source, the hologram element and the light-receiving element being fixed with each other integrally, wherein the diffraction grating is arranged in an optical path of one outward light of the light flux of the second wavelength travelling from the second laser beam light source to the information recording medium and also arranged out of an optical path of another outward light of the light flux of the first wavelength traveling from the first laser beam light source to the information recording medium thereby to allow the backward light of the first wavelength to be diffracted at a predetermined angle and also allow the outward light and the backward light of the second wavelength to be transmitted without being diffracted by the diffraction grating, wherein the hologram element is arranged in the optical path of the outward light of the light flux of the second wavelength and also arranged out of the optical path of the outward light of the light flux of the first wavelength, the hologram element having:
 a first area including a light-flux diameter of the backward light of the second wavelength to diffract the backward light of the second wavelength, thereby irradiating one of ± first-order diffraction lights to a light-receiving area of the light receiving element, in convergence; and
 a second area including a light-flux diameter of the backward light of the first wavelength diffracted by the diffraction grating at the predetermined angle to diffract the backward light of the first wavelength at a reversed-polarity angle to the first area, thereby irradiating one of ± first-order diffraction lights to the light-receiving area of the light receiving element, in convergence, and wherein the light-receiving element receives the backward light of the first wavelength and the backward light of the second wavelength through its light-receiving areas in the same plane and then outputs detection signals due to photoelectric conversion.

2. The optical pickup of claim 1, further comprising an optical-path composition prism between the information recording medium and the diffraction grating,
wherein the optical-path composition prism is adapted so as to allow an incidence of the outward light of the first wavelength thereby to conduct it to the information recording medium and an incidence of the backward light of the second wavelength in a different direction from the outward light of the first wavelength thereby to conduct the incident backward light to the information recording medium, and also adapted so as to conduct the backward lights of the first and second wavelengths, which have been reflected by the information recording medium, to the light-receiving element through the diffraction grating and the hologram element.

3. The optical pickup of claim 1, wherein the diffraction grating is a wavelength-selection type diffraction grating where an optical-path length difference due to concavo-convex portions of gratings is substantially equal to the integral multiple of the second wavelength, and whose diffraction efficiency to the light of the second wavelength is substantially zero.

4. The optical pickup of claim 1, wherein the diffraction grating is a polarization-selection type diffraction grating where an optical-path length difference due to concavo-convex portions of gratings is substantially zero or equal to the integral multiple of the second wavelength in a polarizing direction of at least one of the outward light and the backward light of the second wavelength, and whose diffraction efficiency to the light of the second wavelength in a predetermined polarizing direction is substantially zero.

5. The optical pickup of claim 1, wherein the diffraction grating is any one of a wavelength-selection type diffraction grating, a polarization-selection type diffraction grating and a blazed diffraction grating.

6. The optical pickup of claim 1, wherein the first wavelength is a wavelength within a waveband of 405 nm, while the second wavelength is a wavelength within a waveband of 650 nm.

7. The optical pickup of claim 1, further comprising a third laser beam light source emitting a light flux of a third wavelength to be irradiated to the information recording medium,
wherein the third laser beam light source is arranged integrally with or adjacent to the second laser beam light source and also fixed with the light-receiving element and the hologram element integrally thereby constituting the optical device,
wherein in an outward course for the information recording medium, the light flux of the third wavelength shares a substantially-identical optical path with the outward light of the second wavelength, and
wherein in a backward course from the information recording medium, the light flux of the third wavelength is diffracted by the first area of the hologram element and sequentially led to the light-receiving element.

8. The optical pickup of claim 7,
wherein the first wavelength is a wavelength within a waveband of 405 nm,
wherein the second wavelength is a wavelength within a waveband of 650 nm, and
wherein the third wavelength is a wavelength within a waveband of 780 nm.

9. The optical pickup of claim 1,
wherein the diffraction grating is fixed to the second laser beam light source, the hologram element and the light-receiving element in mutual positional relationships, respectively, and
wherein the diffraction grating, the second laser beam light source, the hologram element and the light-receiving element are arranged integrally with each other, thereby forming the optical device.

10. The optical pickup of claim 9, wherein the diffraction grating is formed on one surface of a transparent parallel plate member, while the hologram element is formed on the other surface of the transparent parallel plate member.

11. An optical device having a light receiving/emitting function for use in an optical pickup that irradiates a convergent light of a first wavelength or a second wavelength to an information recording medium either to detect a reflecting light produced by reflecting of the convergent light on the information recording medium thereby reading information signals recorded along a recording track of the information recording medium or to write the information signals to the information recording medium, the optical device comprising:
a second laser beam light source arranged independently of a first laser beam light source arranged outside of the optical device for emitting the light flux of the first wavelength thereby to emit the light flux of the second wavelength;
a diffraction grating disposed in an optical path of a backward light of either the light flux of the first wavelength or the light flux of the second wavelength reflected by the information recording medium;
a hologram element arranged in an optical path of backward lights produced since the light fluxes of the first wavelength and the second wavelength are reflected by the information recording medium and subsequently transmitted through the diffracting grating; and
a light-receiving element for detecting the backward lights of the first wavelength and the second wavelength, which are transmitted through the hologram element,
wherein the diffraction grating is arranged in an optical path of one outward light of the light flux of the second wavelength traveling from the second laser beam light source to the information recording medium and also arranged out of an optical path of another outward light of the light flux of the first wavelength traveling from the first laser beam light source to the information recording medium thereby to allow the backward light of the first wavelength to be diffracted at a predetermined angle and also allow the outward light and the backward light of the second wavelength to be transmitted without being diffracted by the diffraction grating,
wherein the hologram element is arranged in the optical path of the outward light of the light flux of the second wavelength and also arranged out of the optical path of the outward light of the light flux of the first wavelength, the hologram element having:
a first area including a light-flux diameter of the backward light of the second wavelength to diffract the backward light of the second wavelength, thereby irradiating one of ± first-order diffraction lights to a light-receiving area of the light receiving element, in convergence, and
a second area including a light-flux diameter of the backward light of the first wavelength diffracted by the diffraction grating at the predetermined angle to diffract the backward light of the first wavelength at a reversed-polarity angle to the first area, thereby irradiating one of ± first-order diffraction lights to the light-receiving area of the light receiving element, in convergence;

wherein the light-receiving element receives the backward light of the first wavelength and the backward light of the second wavelength through its light-receiving areas in the same plane and then outputs detection signals due to photoelectric conversion; and wherein the second laser beam light source, the diffraction grating, the hologram element and the light-receiving element are integrally fixed with each other in mutual positional relationships, respectively.

12. The optical device of claim 11, wherein the diffraction grating is formed on one surface of a transparent parallel plate member, while the hologram element is formed on the other surface of the transparent parallel plate member.

* * * * *